June 16, 1964 T. A. SPANKE 3,137,451

APPARATUS FOR WINDING A LENGTH OF TAPE ABOUT A ROTATING ARTICLE

Filed Oct. 16, 1961 5 Sheets-Sheet 1

INVENTOR
T. A. SPANKE
BY J. L. Landis
ATTORNEY

June 16, 1964 T. A. SPANKE 3,137,451

APPARATUS FOR WINDING A LENGTH OF TAPE ABOUT A ROTATING ARTICLE

Filed Oct. 16, 1961 5 Sheets-Sheet 2

INVENTOR
T. A. SPANKE
BY J. L. Landis
ATTORNEY

June 16, 1964 T. A. SPANKE 3,137,451

APPARATUS FOR WINDING A LENGTH OF TAPE ABOUT A ROTATING ARTICLE

Filed Oct. 16, 1961 5 Sheets-Sheet 3

INVENTOR
T. A. SPANKE
BY J. J. Landis
ATTORNEY

INVENTOR
T. A. SPANKE
BY J. J. Landis
ATTORNEY

INVENTOR
T. A. SPANKE
BY J. J. Jandis
ATTORNEY

3,137,451
APPARATUS FOR WINDING A LENGTH OF TAPE ABOUT A ROTATING ARTICLE

Theodore A. Spanke, Indianapolis, Ind., assignor to Western Electric Company Incorporated, New York, N.Y., a corporation of New York Filed Oct. 16, 1961, Ser. No. 145,290
9 Claims. (Cl. 242—7)

This invention relates to apparatus for winding a length of tape about a rotating article, and more particularly to apparatus for advancing the forward end of tape in proper alignment and pressing the tape against the article as the latter rotates to wind a length of the tape thereabout. It is an object of the invention to provide improved apparatus of such character.

Various problems arise in the handling of thin pieces of flexible material. One such problem involves the maintaining of the free end of a paper tape in proper alignment while the tape is being advanced with a pushing action, especially where the free end of the tape is being fed to a moving body. Another such problem arises in maintaining a severed length of tape in pressure contact with a rotating article about which it is being wound. Various other problems associated with the gripping, advancement and alignment of thin pieces of flexible material and relating to the operation of apparatus for accomplishing these functions are solved in accordance with the present invention.

Accordingly, it is another object of the invention to provide improved apparatus for winding a length of tape about a rotating article.

It is still another object of the invention to provide improved apparatus for feeding the free end of a flexible tape in proper alignment to a moving body.

It is a further object of the invention to provide improved apparatus for pressing a tape against a rotating article during the winding of the tape about the article.

Another object of the invention is to provide improved apparatus for advancing and retracting a pressure roller in synchronism with the advancement of a tape to a position closely adjacent an article about which the tape is to be wound.

A further object of the invention is to provide improved apparatus for handling thin pieces of flexible material having various of the characteristics specified above while being simple and rugged in construction, efficient and reliable in operation, and economical to manufacture.

In accordance with the preferred embodiment of the invention, the free end of a flexible tape is fed to a reciprocating carriage during the retraction of the carriage. A temporary guide is employed to guide the free end of the tape into the reciprocating carriage, the guide being removed by the reciprocating carriage from the path of the tape and from the path of the carriage during the latter portion of the retraction of the carriage. The carriage then grips the tape and advances the leading end to a position immediately adjacent an arbor-supported article about which the tape is to be wound through rotation of the article. A pressure roller advances to press the leading end of the tape against the article and to press succeeding portions of the tape against the article during the winding of the tape on the article. The pressure roller is retracted during removal of the taped article from the arbor and insertion of another article on the arbor and during advancement of another length of tape to winding position. Advancement and retraction of the pressure roller is controlled in accordance with the carriage movement through pivotal mounting of the roller on the carriage and through use of cooperating stationary and resiliently supported tracks for the roller.

This invention, together with further objects and advantages thereof, will best be understood by reference to the following description taken in connection with the accompanying drawings, in which FIG. 1 is a front elevational view of a machine incorporating a preferred embodiment of the invention;

Figure 1:
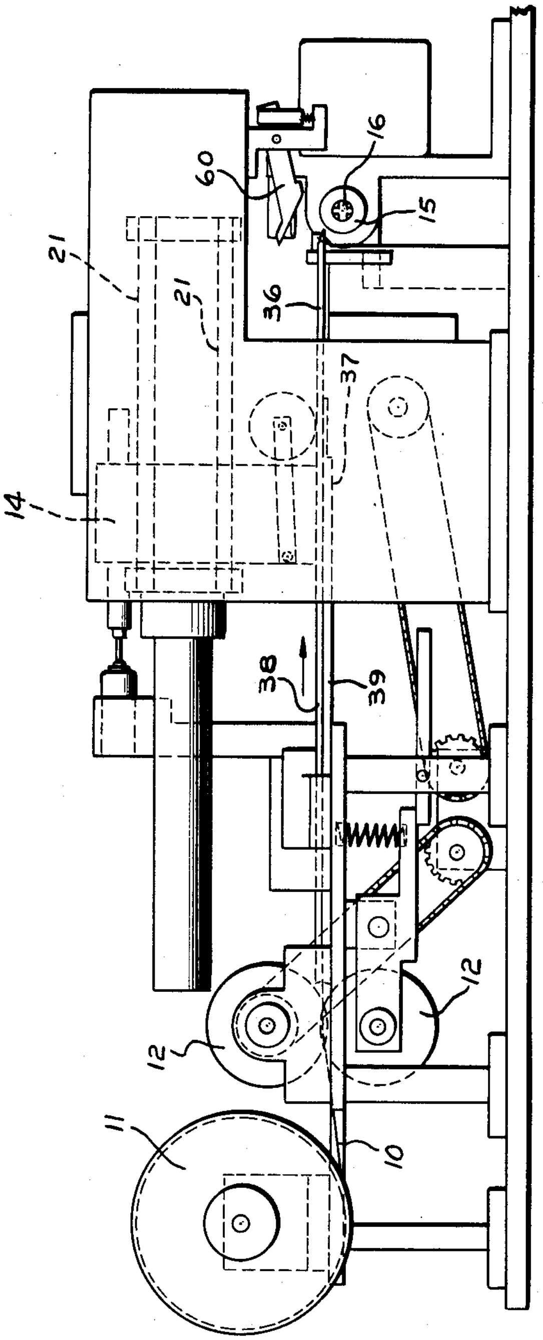

In the drawings the present invention is shown embodied in a machine which draws paper tape 10 from a supply reel 11 (see FIG. 1) through the action of feed rollers 12, advances the free end of the tape into a reciprocating carriage 14 during the return stroke thereof, severs a prescribed length of the tape, and advances the free end of the tape over an adhesive applicator 13 to a position closely adjacent an article 15 mounted on an arbor 16. It is intended that the arbor 16 be intermittently rotated to cause winding of the length of paper tape about the article 15. In the illustrated embodiment of the invention, the article 15 comprises an electrical coil which is to be wrapped by the paper strip for protection of the coil.

The present invention is not concerned with the initial or lefthand portions of the machine including the supply reel 11 and the feed rollers 12. Neither is it concerned with the drive means for the various portions of the machine or the control of the drive means such that the various portions of the machine operate in synchronism and in proper phase relation. Accordingly, these portions of the overall machine are not shown in detail in the drawings or described in detail herein. For the purpose of understanding the present invention, it is believed to be sufficient to appreciate that the lefthand portion of the machine as viewed in FIG. 1 performs the various functions briefly referred to above, and that the drive means and the control means therefor cause all portions of the machine to perform their various functions in proper, timed relationship.

Figure 2:
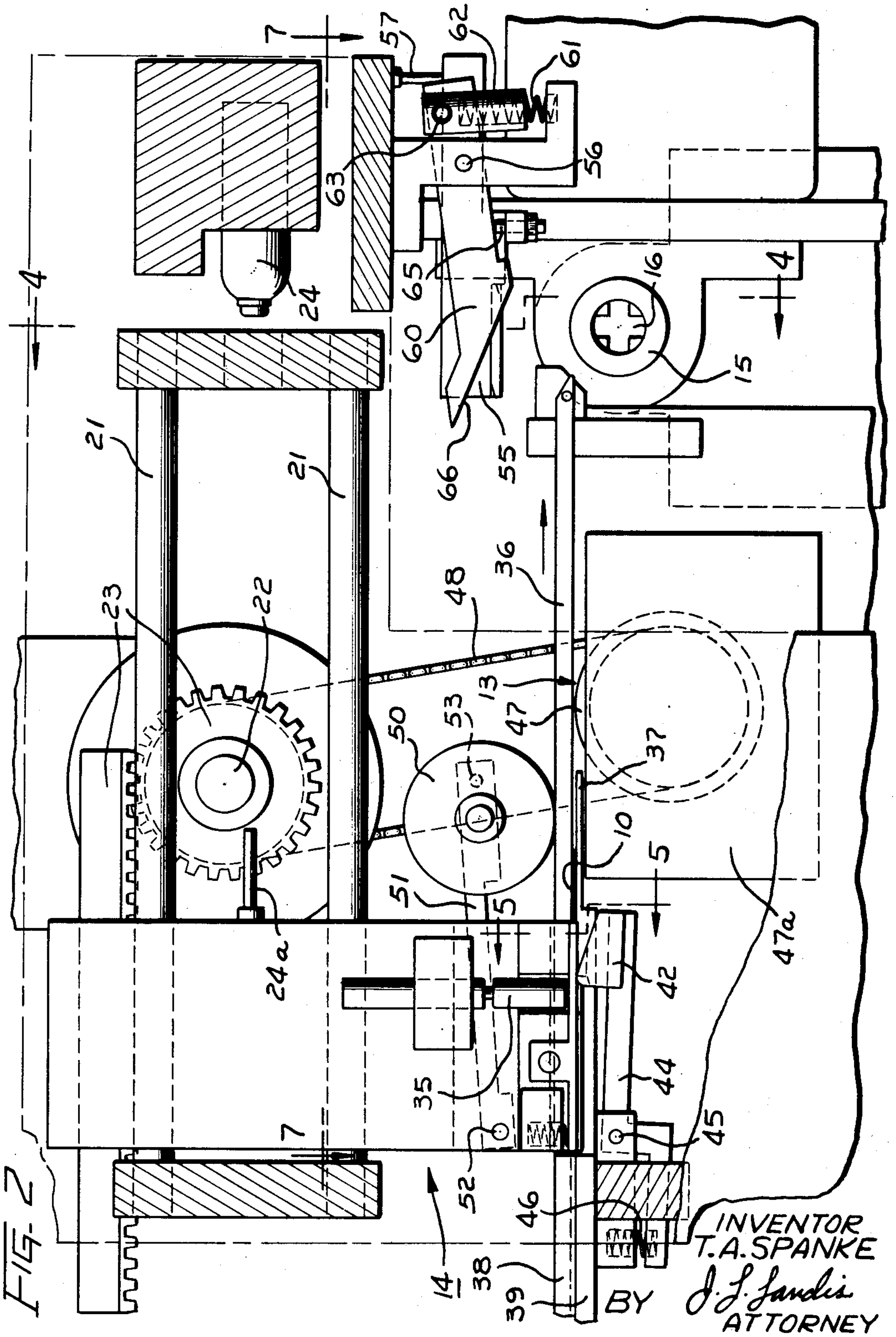
FIG. 2 is an enlarged front elevational view of a portion of the apparatus shown in FIG. 1.
Figure 3:
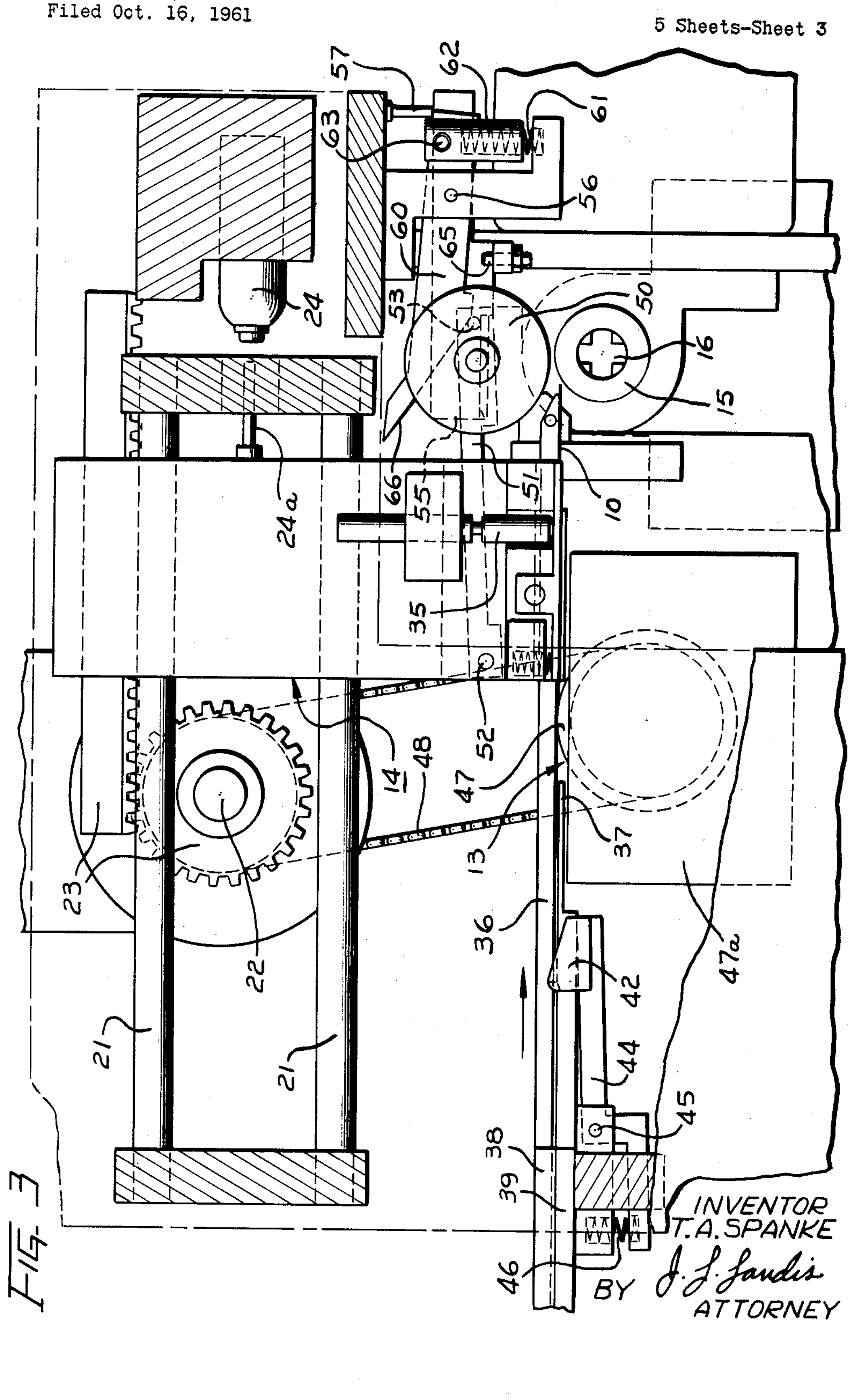
FIG. 3 is a front elevational view similar to FIG. 2 but showing the apparatus in a different operating position.

The carriage 14 which serves to advance the leading end of the tape 10 to a position immediately adjacent the arbor-mounted article 15 is reciprocable on a pair of fixed guides 21 seen best in FIGS. 2 and 3. Reciprocation of the carriage 14 along the fixed guides 21 may be effected through any suitable drive means such as the shaft 22 and the rack and gear mechanism 23 of FIGS. 2 and 3, and may be controlled by any suitable means including a fixedly positioned limit switch 24 and a carriage mounted pin 24a, also seen in FIGS. 2 and 3.

Figures 6, 7:
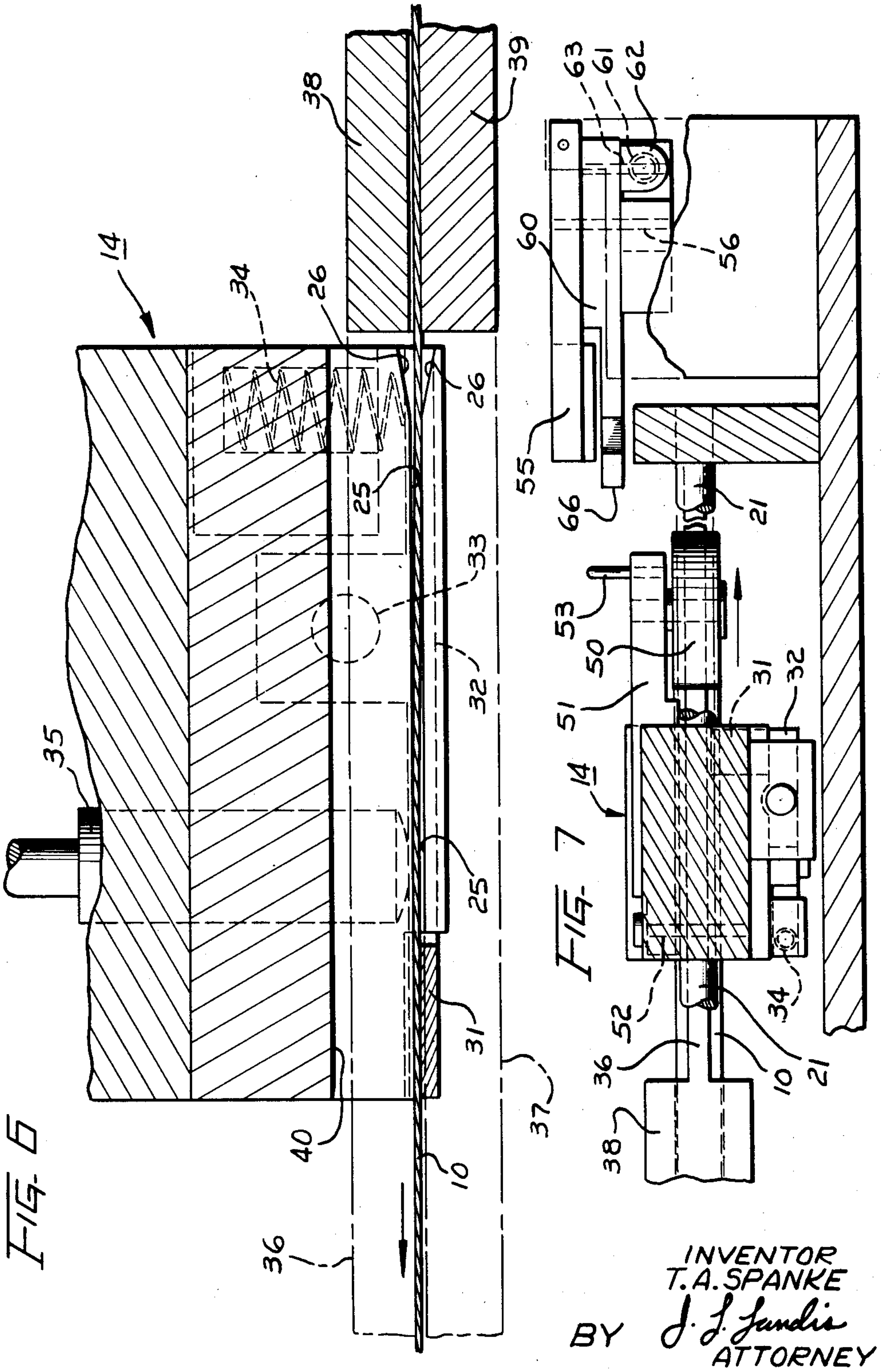
FIG. 6 is a partial cross-sectional view taken along the line 6—6 of FIG. 5.
FIG. 7 is a partial cross-sectional view taken along the line 7—7 of FIG. 2.

Reference is now made to FIG. 6 which is a sectional view taken from the rear of the machine such that the left and righthand are reversed relative to FIGS. 1, 2, 3 and 7. To avoid confusion, reference to directions is made herein in terms of the direction of movement of the paper tape 10, which is from right to left in FIG. 6 and from left to right in FIGS. 1, 2, 3 and 7.

The carriage 14 is provided with a slot 25 for receiving the paper tape 10, the slot being tapered at its tape inlet end 26 as seen best in FIG. 6 to facilitate entry of the free end of the tape. The slot 25 is defined in part by an arm 31 extending laterally from a lever 32 which is pivotable about a pin 33. A spring 34 bears down against the tape inlet end of the lever 32 such that the arm 31 is biased upward against the bottom of the carriage 14 to grip the tape 10. A power-actuatable plunger 35 is arranged to move the tape outlet end of the lever 32 downward such that the arm 31 moves away from the lower surface of the carriage 14 and releases the tape 10.

When the carriage 14 is in its retracted position, illustrated in FIG. 2, the plunger 35 is lifted by suitable control means, not shown, such that the spring 34 may tilt the lever 32 and cause the arm 31 to grip the paper tape 10 near its forward end. When the carriage is in its advanced position as illustrated in FIG. 3, the plunger 35 is lowered such that the forward end of the lever 32 is depressed and the arm 31 releases the paper tape. The arm 31 is maintained in its released position throughout the return stroke of the carriage 14.

In order to increase the operating speed of the machine, the leading end of the tape supply is fed forward prior to the return stroke of the carriage such that when the carriage has reached its retracted position, the tape is already in position to be gripped by the arm 31.

Figure 5:
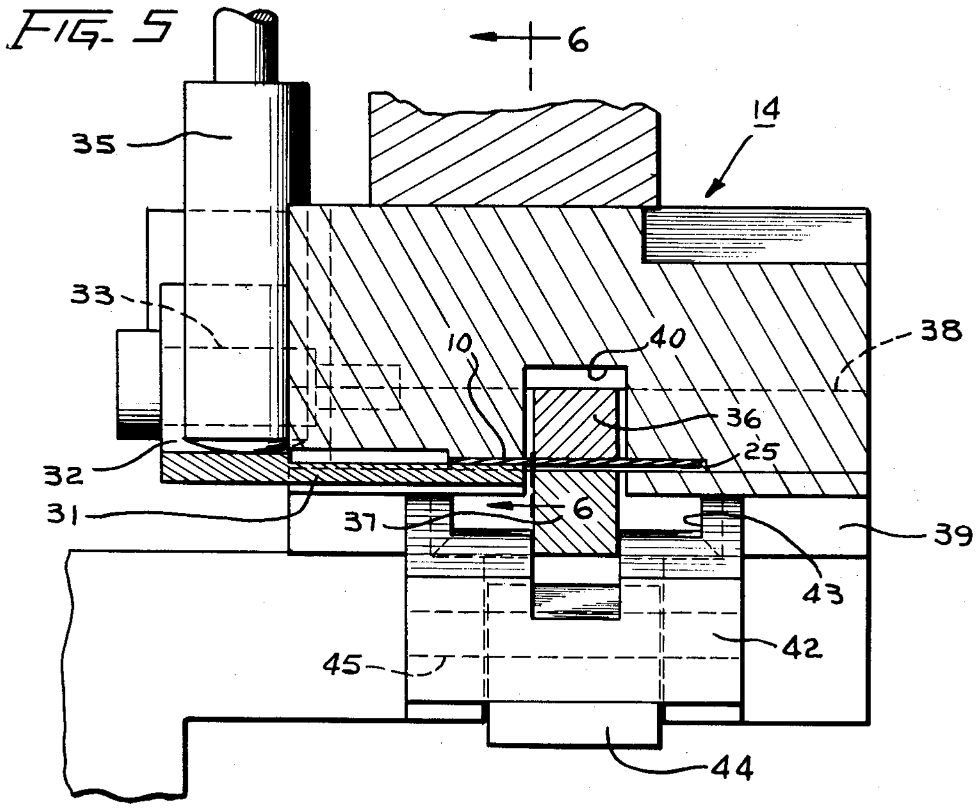
FIG. 5 is a partial cross-sectional view taken along the line 5—5 of FIG. 2.
Figure 4:
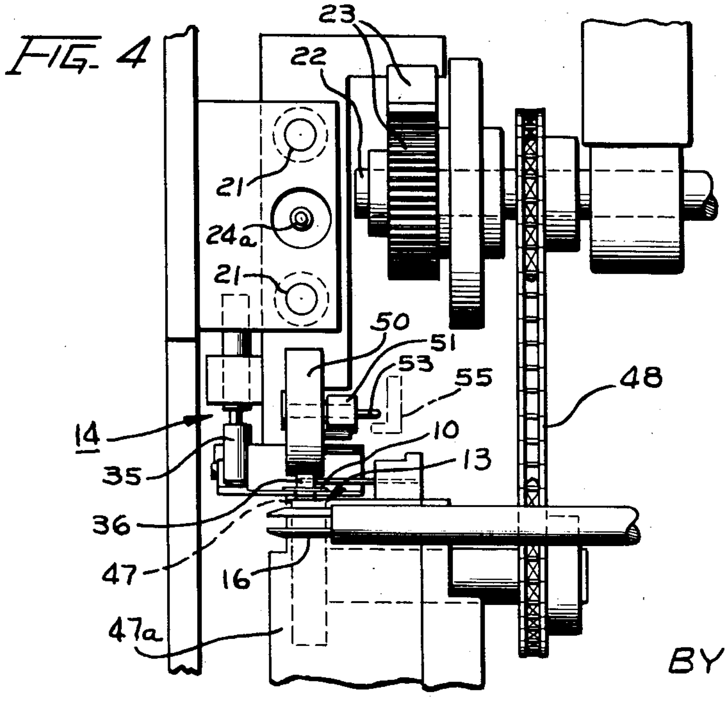
FIG. 4 is a partial cross-sectional view taken along the line 4—4 of FIG. 2.

During the forward feeding of the tape by the feed rollers 12, the tape is guided vertically by a pair of bars 36 and 37 which are narrow extensions of corresponding plates 38 and 39. In FIG. 5 it may be seen that the bars 36 and 37 extend through a slot 40 in the carriage 14. It will be noted further that the slot 25 in the carriage 14 which receives and guides the tape 10 consists of two portions which receive respective edges of the tape 10, both portions opening into the larger slot 40 which receives the bars 36 and 37. The space between these bars comprises a central extension of the slot 25 in the carriage.

As may be seen best in FIG. 2, the upper bar 36 extends substantially to the arbor 16 while the lower bar 37 extends beyond the carriage 14 in its retracted position. Both bars extend substantially to or beyond the point to which the free end of the tape 10 is advanced by the feed rollers 12 prior to the return stroke of the carriage. These bars, therefore, provide vertical guidance for the tape such that the tape is fed at the proper level to enter the slot 25 in the carriage.

Since the bars 36 and 37 must necessarily be narrower than the tape 10 for reasons which will be obvious upon reference to FIG. 5, that portion of the tape which is fed beyond the plates 38 and 39 during the return stroke of the carriage can be given no lateral guidance by the bars 36 and 37. Accordingly, the leading end of the tape may be laterally displaced sufficiently during the forward feeding thereof that it will not enter the slot 25 in the carriage 14 when the carriage meets the paper in its return stroke.

A guide 42 is provided in order to furnish the lateral guidance which is necessary to assure entry of the leading end of the tape 10 into the slot 25. The guide 42 may be seen in FIG. 5 to define a slot 43 in its upper face for receiving the tape 10. The guide 42 is also notched as shown in FIG. 5 to receive the lower bar 37.

When the carriage 14 is in its advanced position, the guide 42 is arranged to guide the free end of the tape 10 in a position which is occupied by the carriage when the latter is in its retracted position. The guide 42 is, therefore, mounted for movement into and out of guiding position. In FIG. 2, it may be seen that the guide 42 is mounted on the forward end of a lever 44 which is pivotable about a pin 45. The lefthand end of the lever 44 is urged downward by a spring 46 such that the righthand end of the lever 44 and the guide 42 are urged upward. As may be seen in FIGS. 2 and 5, the guide 42 bears against the bottom surface of the carriage 14 when the carriage is in its retracted position. When the carriage moves forward past the guide 42, the latter is free to swing upward to a tape guiding position under the influence of the spring 46. With the guide in this position, tape may enter the slot 43 such that it is guided laterally and is assured of entering the slot 25 in the carriage when the carriage is retracted. Upon return movement of the carriage, the lefthand end engages the upper sloping surface of the guide 42 and cams the guide downward out of the path of the carriage. In this manner, the guide 42 is made automatically to guide the leading end of the tape 10 when the carriage is in its forward position and to move out of the path of the carriage when the carriage approaches its retracted position.

Prior to the next forward stroke of the carriage 14, the forward portion of the tape 10 is severed from the supply by suitable power-operated shears, not shown. Accordingly, only a severed length of tape is advanced during the ensuing forward stroke of the carriage.

During the forward stroke, the severed length of tape passes over and in contact with an adhesive applicator roller 47, see FIGS. 2 and 3, which is arranged within a tank **47*a*. A suitable adhesive is maintained at a prescribed level within the tank 47*a* such that the applicator roller may dip into the adhesive and apply it to the tape 10, all in a manner well known in the art. For more effective application of the adhesive to the tape, it is preferable that the applicator roller 47 be self powered. In the illustrated embodiment of the invention this is accomplished by a chain and sprocket system generally designated 48 through which the applicator roller 47 is driven by the shaft 22**.

Accordingly, when the leading end of a length of tape is advanced by the carriage 14 to a position immediately adjacent the arbor-mounted article 15, it will have had a suitable adhesive applied to the lower surface thereof such that it may adhere to the article 15 when it is pressed against the article and wound thereabout.

In the illustrated embodiment of the invention, the tape is pressed against the article 15 by a roller 50. Pressure by this roller is first applied after the leading end of the tape has been advanced to a position immediately adjacent the article. More specifically, the leading end of the tape is brought to a position immediately above the article 15 after which the roller 50 presses the tape down against the article. Preferably, the article 15 and the tape 10 remain stationary for a brief period of time with pressure applied by the roller 50 such that the leading end of the tape may be made to adhere to the article.

The arbor 16 is then caused to rotate by suitable drive means under the control of suitable control means, not shown, such that the length of tape 10 is wound about the article. During this time the roller 50 continues to press the tape against the article such that the entire length of the tape is brought firmly into contact with the article and/or previous turns of tape.

The roller 50 must then be withdrawn such that the wrapped article may be removed from the arbor, another article pressed upon the arbor, and another length of tape fed to a position immediately adjacent the new article. The apparatus which is provided for accomplishing these required movements of the roller 50 in timed sequence with the movement of the carriage is seen best in FIGS. 2 and 3.

The roller 50 is rotatably mounted on a lever 51 which is pivotably mounted on the carriage 14 through a pin 52. The roller 50 is aligned with the bar 36 and rides on and is supported by that bar at all times except when the carriage is in its advanced position or closely adjacent thereto.

When the carriage approaches its advanced position, a pin 53 which protrudes from the rearward side near the free end of the lever 51 rides onto the horizontal leg of a lever 55 of L-shaped cross section (FIGS. 2, 3 and 7). Accordingly, when the roller 50 passes beyond the end of the bar 36 the roller may not drop immediately into engagement with the article 15 on the arbor 16 and thereby interfere with the final forward movement of the paper tape 10 by the carriage 14. When the carriage 14 reaches its full advanced position, the pin 53 passes beyond the end of the horizontal leg of the L-shaped bar 55 such that the roller 50 is free to drop into contact with the forward end of the tape 10. While the roller 50 thus presses the tape against the arbor, and after a momentary delay to permit adherence of the leading edge of the tape to the article, the arbor 16 is caused to rotate through properly controlled drive means, not shown, such that the tape is wound about the article with the roller 50 pressing the tape against the article and against previous turns of the tape.

Upon withdrawal of the carriage 14, the roller 50 rides off the wrapped article and onto the bar 36. In so doing it raises the lever 51 and the pin 53 such that the latter strikes the lower surface of the horizontal leg of the L-shaped bar 55. In order to permit the roller to ride up onto the bar 36, the L-shaped bar 55 is pivotally mounted on the frame of the machine through a pin 56. The initial withdrawal of the roller 50 is, therefore, accompanied by a clockwise pivoting of the L-shaped bar 55 by the pin 53. After the pin 53 has been carried to the left beyond the end of the bar 55, the bar 55 is free to pivot in a counterclockwise direction until the righthand end thereof engages a stop pin 57. The L-shaped bar is then in position to catch the pin 53 on the upper surface of its horizontal leg upon the next advancement of the carriage 14.

In the illustrated embodiment of the invention, the roller 50 has insufficient weight to press the tape against the article with the desired pressure. A spring-biased depresser 60 is employed to apply additional pressure. The depresser 60 is pivotable about the same pin 56 which supports the L-shaped bar 55 and is urged in a counterclockwise direction by a spring 61 acting through a sleeve 62 which is pivotally connected to the righthand end of the depresser 60 through a pin 63. Counterclockwise movement of the depresser is limited through engagement with an adjustable stop 65 mounted on the bar 55.

When the pin 53 associated with the roller 50 passes along the upper surface of the horizontal leg of the L-shaped bar 50 during movement of the carriage toward its advanced position, the pin 53 engages a beveled edge 66 of the depresser 60 and cams the latter in a clockwise direction against the action of the spring 61. When the pin 53 passes beyond the horizontal leg of the L-shaped bar 55, downward movement of the roller 50 is abetted by the depresser 60. In this manner, the force of the depresser 60 is added to the weight of the roller 50 and associated parts to produce an adequate pressure for obtaining adhesion between the tape 10 and the article 15.

As the roller 50 is withdrawn from the wrapped article and moves along the bar 36, the pin 53 breaks contact with the depresser, leaving it in its normal position illustrated in FIG. 2. By virtue of the spring-biased depresser acting against the stop 65 on the bar 55, the latter is spring biased toward its normal position.

It will now be seen that the embodiment of the invention illustrated in the drawings and described above provides for improved and simplified wrapping of tape about an article. The apparatus provides for the guiding of the free end of a flexible tape, which is being advanced by a pushing action, into a slot in a moving body. As explained above, guidance in one direction laterally of the tape, namely vertically, may be obtained through fixed guide means which extend through the moving body. However, if the tape is to be received within a slot in the moving body, as is required in the present case, the tape cannot be guided in the other or horizontal direction, laterally of the tape, by fixed guide means. The illustrated embodiment of the invention provides for full guidance of the tape with very simple structure and without separate controls. Very simple means are also provided for controlling the pressing of the tape against the article about which the tape is to be wound, this control apparatus operating in accurately timed relationship with respect to the tape advancing carriage.

While one embodiment of the invention has been disclosed, many modifications will be apparent, and it is intended that the invention be interpreted as including all modifications which fall within the true spirit and scope of the invention.

What is claimed is:

1. In a machine for winding a length of tape about a rotating article, an arbor for intermittently rotating the article, a reciprocable carriage for advancing the forward end of the tape to a position adjacent the article, roller means for pressing the tape against the article, and means operating in synchronism with the movement of said carriage for advancing said roller means into tape pressing position when the tape has been advanced to its position adjacent the article and prior to rotation of the article, and for retracting said roller means when the tape has been wound on the article, said advancing and retracting means comprising means for mounting said roller means on said carriage whereby said roller means is carried back and forth with said carriage, and guide means extending along the path of movement of said carriage and engageable with said roller means for guiding said roller means into and out of tape pressing position.

2. In a machine for winding a length of tape about a rotating article, an arbor for rotating the article, a reciprocable carriage for advancing the forward end of the tape to a position adjacent the article, roller means for pressing the tape against the article, and means operating in synchronism with the movement of said carriage for advancing said roller means into tape pressing position when the tape has been advanced to its position adjacent the article and for retracting said roller means when the tape has been wound on the article, said advancing and retracting means comprising means for mounting said roller means on said carriage whereby said roller means is carried back and forth with said carriage, said roller means being mounted on said carriage for pivotal movement about an axis substantially removed from the axis of rotation of said roller means, and guide means extending along the path of movement of said carriage and engageable with said roller means for guiding said roller means toward and away from said arbor, said guide means terminating adjacent said arbor such that said roller means may disengage from said guide means and pivot into tape pressing position when said carriage moves toward said arbor.

3. Apparatus as specified in claim 2 wherein said roller means include a roller, and a frame on which said roller is rotatably supported, said frame being pivotally mounted on said carriage, and said roller being engageable with and rolling along said guide means as said carriage reciprocates, and wherein cam means are provided including a first cam element mounted on said frame and a second cam element arranged adjacent said arbor for maintaining said roller out of tape pressing position after said roller disengages from said guide means and until said carriage has reached substantially the end of its forward stroke such that the tape has been fully advanced thereby.

4. In a machine for winding a length of tape about a rotating article, an arbor for rotating the article about a horizontal axis, a generally horizontally reciprocable carriage for advancing the forward end of the tape to a position above and adjacent the article, roller means rotatable about a horizontal axis for pressing the tape downward against the article, and means operating in synchronism with the movement of said carriage for advancing said roller means into tape pressing position when the tape has been advanced to its position above and adjacent the article and for retracting said roller means when the tape has been wound on the article, said advancing and retracting means comprising means for mounting said roller means on said carriage whereby said roller means is carried back and forth with said carriage, said roller means being mounted on said carriage for pivotal movement about a horizontal axis parallel to and substantially removed from the axis of rotation of said roller means, and generally horizontal guide means extending along the path of movement of said carriage for supporting said roller means and for guiding said roller means toward and away from said arbor, said guide means terminating adjacent said arbor such that said roller means may disengage from said guide means and pivot downward into tape pressing position when said carriage moves toward said arbor.

5. Apparatus as specified in claim 4 wherein said roller means include a roller, and a frame on which said roller is rotatably supported, said frame being pivotally mounted on said carriage, and said roller being engageable with and rolling along said guide means as said carriage reciprocates, and wherein cam means are provided including a first cam element mounted on said frame and a second cam element arranged adjacent said arbor for supporting said roller out of tape pressing position after said roller disengages from said guide means and until said carriage has reached substantially the end of its forward stroke such that the tape has been fully advanced thereby.

6. Apparatus as specified in claim 5 wherein a spring-biased lever is provided adjacent the arbor, said lever being so positioned as to be engageable by said first cam element and to bear down resiliently against said first cam element when said roller means are adjacent said arbor.

7. Apparatus as specified in claim 6 wherein said second cam element is pivotable upwardly to permit withdrawal of said first cam element from under said second cam element as said roller rides up onto said guide means upon retraction of said carriage, wherein stop means are provided to limit downward pivotal movement of said second cam element, and wherein said second cam element is engageable by said spring-biased lever to urge said second cam element downward against said stop means and to limit downward pivotal movement of said lever.

8. Apparatus as specified in claim 2, wherein said carriage is provided with a slot for receiving a length of tape fed thereto; wherein means are provided on said carriage for gripping the forward end of the tape during the advancement of said carriage and for releasing the tape when it has been positioned adjacent to the article; and wherein temporary guide means are provided which cooperate with said carriage during the retraction thereof, to guide the forward end of the tape so that it is fed into the slot in said carriage, and which are subsequently removed from the path of carriage-retraction.

9. Apparatus as specified in claim 4, wherein said carriage is provided with a slot for receiving a length of tape fed thereto; wherein means are provided on said carriage for gripping the forward end of the tape during the advancement of said carriage and for releasing the tape when it has been positioned adjacent to the article; wherein an upper and a lower guide are provided which are spaced apart substantially the height of the slot in said carriage so as to provide vertical guidance of the forward end of the tape as it is fed to the carriage upon retraction thereof; wherein a temporary guide is provided for constraining the horizontal movement of the forward end of the tape to a path in alignment with the slot in said carriage whereby the forward end of the tape is received in the slot in said carriage upon retraction thereof, said horizontal guide being pivotably mounted at its end remote from said carriage and having a camming surface at its other end for engaging the carriage as it is retracted so that the temporary guide is pivoted out of the path of carriage movement after the forward end of the tape has been received in the slot in said carriage; and wherein resilient means are provided for biasing said temporary guide to the tape-guiding position.

References Cited in the file of this patent

UNITED STATES PATENTS 743,083 Jagenberg -------------- Nov. 3, 1903